United States Patent [19]

König et al.

[11] 4,389,553

[45] Jun. 21, 1983

[54] ROTARY DISCONNECT SWITCH

[75] Inventors: Werner König, Heddesheim; Wolfgang Wagenbach, Linsengericht; Hans May, Bad Durkheim; Rolf Bleidt, Hanau, all of Fed. Rep. of Germany

[73] Assignee: Brown, Boveri & Cie AG, Mannheim-Käfertal, Fed. Rep. of Germany

[21] Appl. No.: 160,560

[22] Filed: Jun. 18, 1980

[30] Foreign Application Priority Data

Jun. 19, 1979 [DE] Fed. Rep. of Germany ....... 2924630

[51] Int. Cl.[3] .............................................. H01H 33/60
[52] U.S. Cl. ............................. 200/148 H; 200/150 C
[58] Field of Search ............ 200/148 H, 150 C, 148 R

[56] References Cited

U.S. PATENT DOCUMENTS 3,646,284  2/1972  Bokshorn et al. .............. 200/148 H

FOREIGN PATENT DOCUMENTS

2818914 10/1979  Fed. Rep. of Germany ... 200/148 H

Primary Examiner—Robert S. Macon
Attorney, Agent, or Firm—Herbert L. Lerner; Laurence A. Greenberg

[57] ABSTRACT

Rotary disconnect switch assembly, including a metal encapsulation insulated with SF$_6$ gas, flanges integral with the encapsulation, support insulators disposed on the flanges, a drive shaft passing through the encapsulation and having a portion disposed outside and a portion disposed inside the encapsulation, a drive connected to the outside portion of the drive shaft, a profile formed on the inside portion of the drive shaft, three disconnect blades fastened side by side in axial direction of the inside portion of the drive shaft, intermediate pieces passing through the support insulators being connectible to phase conductors, and an opposite pair of first and second fixed contacts for each individual phase connected along the intermediate pieces in axial direction of the drive shaft, the blades being rotatable between an "on" position in which they connect the first and second contacts to each other and a "disconnect" position.

17 Claims, 9 Drawing Figures

ROTARY DISCONNECT SWITCH

The invention relates to a rotary disconnect switch which is disposed in a metal encapsulation, is $SF_6$ gas-insulated, is driven by a drive located outside of the metal encapsulation, and has at least one blade which can be turned from the position "disconnect switch closed" in which they connect oppositely disposed first and second fixed contacts to each other, into a disconnect position; wherein the at least one disconnecting blade is fastened on a drive shaft provided with an external profile, which protrudes in the encapsulation at the other end thereof and is connected to the drive.

Besides so-called thrust disconnect switches, rotary disconnect switches have also been used in metal-encapsulated switching stations. These switches have a rotatable double arm within an approximately spherical metal encapsulation which can be brought from a disconnect position through a drive into the "on" position (see German Published Prosecuted Application DE AS No. 2 101 402). The metal encapsulation is partitioned off at both ends thereof by a bulk-head insulator; on the insulator follow either ducts or other structural parts belonging to the switching station.

While the so-called thrust disconnect switches require only relatively little radial space, a rotary disconnect switch requires relatively greater space because of the rotary motion of the arms transversely to the longitudinal axis of the disconnect switch. For this reason, rotary disconnect switches have been installed only in rare cases in most switching stations which have been produced. However, a rotary disconnect switch is simpler than the thrust disconnect switch because of the simple drive to the rotating arm. This is because in the thrust disconnect switch a rotary motion of the drive (usually transversely to the longitudinal axis of the switch) must be converted into a thrust motion in the direction of the longitudinal axis.

It is accordingly an object of the invention to provide a rotary disconnect switch, especially for a three-phase encapsulation, which overcomes the hereinafore-mentioned disadvantages of the heretofore-known devices of this general type, in which the radial dimensions are substantially reduced in comparison to the known rotary disconnect switch (see German Published Prosecuted Application DE AS No. 2 101 402).

With the foregoing and other objects in view, there is provided, in accordance with the invention, a rotary disconnect switch assembly, comprising a metal encapsulation insulated with $SF_6$ gas, flanges integral with the encapsulation, support insulators disposed on the flanges, a drive shaft passing through the encapsulation and having a portion disposed outside and a portion disposed inside the encapsulation, a drive connected to the outside portion of the drive shaft, a profile formed on the inside portion of the drive shaft, three disconnect blades fastened side by side in axial direction of the inside portion of the drive shaft, intermediate pieces passing through the support insulators being connectible to phase conductors, and an opposite pair of first and second fixed contacts for each individual phase connected along the intermediate pieces in axial direction of the drive shaft, the blades being rotatable between an "on" position in which they connect the first and second contacts to each other and a "disconnect" position.

In accordance with another feature of the invention, the switch has a space formed in the interior thereof, and the support insulators are in the form of bulk-head insulators terminating in the space.

In accordance with a further feature of the invention, if the disconnect switch according to the invention is to find application in three-phase encapsulated switching stations, there are provided three phase conductors disposed at corners of an equilateral or isosceles imaginary triangle, two of the conductors being disposed in one plane and the third being disposed intermediate and vertically thereabove, two of the fixed contacts being aligned with the two conductors, and a slightly bent L-shaped connecting piece connecting the remaining fixed contact to the intermediate upper conductor.

It is also possible to make the fixed contacts in an L-shape; while the three fixed contacts lie in one line, they are therefore located in one plane which goes approximately through the center of the disconnect switch. If the L-shaped fixed contacts are made absolutely symmetrical, the fixed contacts are exactly in one line which is on the center line of the disconnect switch.

In accordance with an added feature of the invention, there are provided two arms integral with each of the blades, the arms being disposed in the same plane and being eccentric or offset with respect to the drive shaft.

In accordance with an additional feature of the invention, each of the blades is in the form of an angle lever having a pair of long and short arms respectively connectible to the first and second contacts, the arms being mutually offset by approximately 135°. In this manner, size reduction of the outer contour or the outside diameter of the metal encapsulation is obtained, particularly if the disconnect switch is to be turned or switched into a grounding position. Constructing the arms in the form of an angle lever has the further advantage in accordance with yet another feature of the invention, that there is provided a circular segment-shaped intermediate part connected to each of the pair of arms, the radius of which is equal to the length of the shorter lever or is smaller. In the case of a disconnect action, part of this intermediate region then remains in electrically conducting connection with the contact elements or contacts with which the shorter arm was in connection. In this manner, it is provided that each disconnect blade remains at the electric potential at which the adjacent phase conductors are, so that also an electrically favorable construction can be obtained and so that optimal grounding without spreading capacitive leakage currents is possible.

It is then advantageous to surround the fixed contacts, with which the individual disconnect blades are still in connection, with shields adapted to the disconnect blades, whereby an even more advantageous field distribution is obtained.

In accordance with yet a further feature of the invention, there are provided mutually aligned L-shaped ends integral with each of the fixed contacts connectible to the long arm of the blades.

In accordance with yet an added feature of the invention, the fixed contacts are integral with the intermediate pieces.

In accordance with still another feature of the invention, the axis of the drive shaft is outside the axis of the encapsulation.

So as to prevent a drive shaft which is constructed as an insulating rod from being twisted against the disconnect blades, in case of a disconnect action, in accordance with still a further feature of the invention, the drive shaft has a non-circular cross-sectional shape.

In accordance with still an added feature of the invention, there is provided a first half-shell integral with each of the blades and a mounting bracket connectible to the first half-shell, the first half-shell and the mounting bracket having contours formed therein together matching the cross-sectional shape of the drive shaft.

In accordance with still an additional feature of the invention, there is provided a screw and nut for connecting the first half-shell to the mounting bracket after mounting on the drive shaft.

In accordance with again another feature of the invention, the fixed contacts have slots formed therein, forming inner surfaces spaced apart by a distance corresponding to the thickness of the blades, the blades being insertable into the slots, and there are provided opposing contact fingers disposed on the inner surfaces of the contacts, the fingers being resiliently and optionally individually contactible with the blades.

In accordance with again a further feature of the invention, the contact fingers are laminations formed on the contacts.

In accordance with again an added feature of the invention, the blades are further rotatable beyond the disconnect portion into a grounding position, and including a grounding contact contactable by the short arm in the grounding position.

In accordance with again an additional feature of the invention, the grounding contact is fastened to and extended outside the encapsulation, and including a frame for insulating the grounding contact from the encapsulation, and means for connecting the grounding contact to the encapsulation.

In accordance with a concomitant feature of the invention, there are provided shieldings being matched to the outer contours of a disconnect blade and surrounding the contacts, the blades being disposed substantially within the shielding in the disconnect position.

Due to the special construction of the contact blades, the free ends of which are at an obtuse angle relative to each other, the radial dimensions of the metal encapsulation can be reduced considerably, as already mentioned. Especially in the encapsulated three-phase installation, the space for the disconnect switch can be reduced further by using the above-mentioned features of the triangularly disposed conductors located as described; the two-armed co-planar offset blades; the angle lever with long and short arms; the circular segment; and the L-shaped ends, so that the disconnect switch then fits the rest of the metal-encapsulated switching station harmoniously.

Other features which are considered as characteristic for the invention are set forth in the appended claims.

Although the invention is illustrated and described herein as embodied in a rotary disconnect switch, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
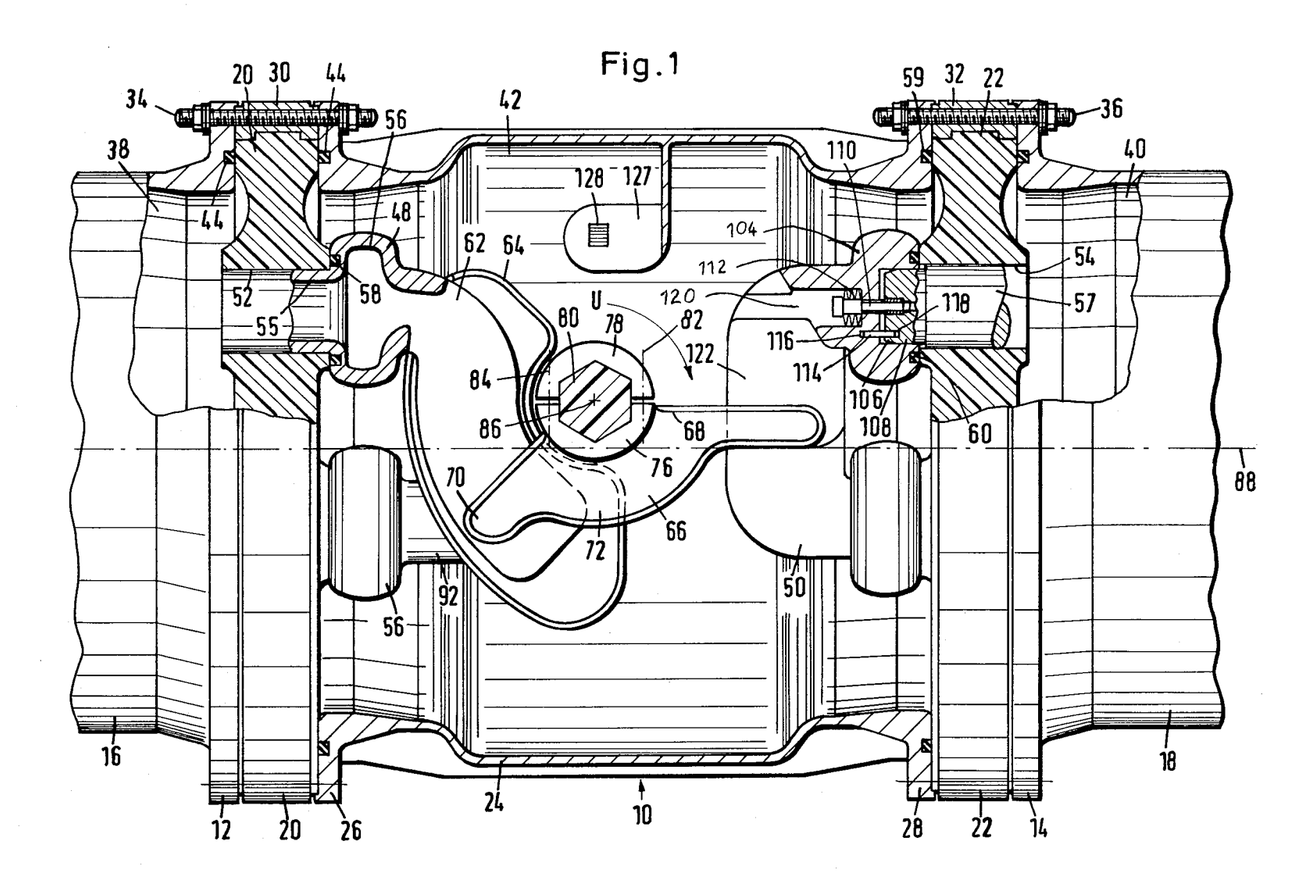
FIG. 1 is a fragmentary diagrammatic cross-sectional view of a rotary disconnect switch according to the invention in the "on" position, partly broken away.

Referring now to the figures of the drawing and first particularly to FIG. 1 thereof, there is seen a cross section through an encapsulated three-phase disconnect switch according to the invention, taken along the longitudinal axis thereof. This disconnect switch as a whole is designated with reference numeral 10. The switch 10 is inserted between the flange ends 12 and 14 of a tubular gas bar 16 or 18 which is three-phase metal-encapsulated and $SF_6$ gas-insulated. Two support or bulk-head insulators 20 and 22 are interposed between the switch 10 and the gas bar 16, 18. The metal encapsulation 24 of the rotary disconnect switch has flanges 26 and 28 at its two end faces. The dimensions of the flanges 26, 28 correspond to the flanges 12 and 14. In this way the two bulk-head insulators 20 and 22, each of which is surrounded by a spacer ring 30 and 32, respectively, can be bolted together between the opposite flanges 12, 26, 14, 28 by the screw connections 34 and 36 which go through the spacer rings 30 and 32, respectively. The insulators 20 and 22, each of which are seen partially in cross section, serve for partitioning-off the space 38 or the space 40 of the tubular gas bar 16 or 18 against the interior bulk-head space 42 of the rotary disconnect switch. In order to ensure that the partitioning is gas-tight, gaskets 44 are inserted between the touching surfaces of the bulk-head insulators 20 and 22, respectively, and the flanges 12, 26 and 14, 28, respectively, so that no gas can escape to the outside at the clamping points between the two flanges 12 and 26 as well as between the flanges 14 and 28, respectively.

Figure 5:
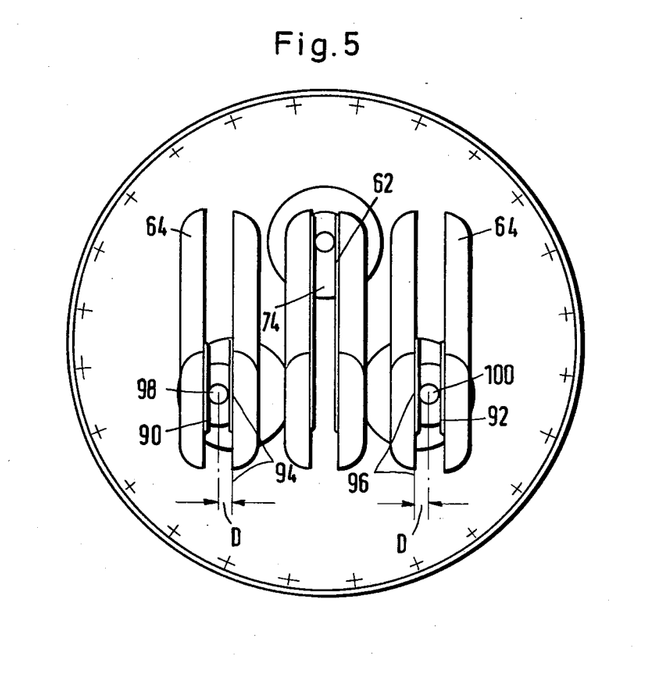
FIG. 5 is a top plan view of FIG. 4 taken in the direction of the arrow F therein.

The individual non-illustrated phase conductors are held by the bulk-head insulators 20 and 22 in cutouts 52 and 54, respectively, and are connected through intermediate pieces 55 and 57 to fixed contacts 48 and 50 (first and second fixed contacts). Of the fixed contacts 48, 50 only the first which is in connection with the upper phase conductor is to be described first. The intermediate piece 55, which is joined to the corresponding phase conductor, is extended within the bulk-head space 42 in an enlargement 56, which is in turn followed by an approximately S-shaped extension 62. The two lower phase conductors are connected to an intermediate piece each (not shown in detail), which likewise changes in the interior of the space 42 into an enlargement; the reference numeral 56 thereof being the same as that of the enlargement of the upper phase conductor, in order to indicate the similarity of construction. The lower first fixed contacts 90, 92 (see FIG.

Figure 4:
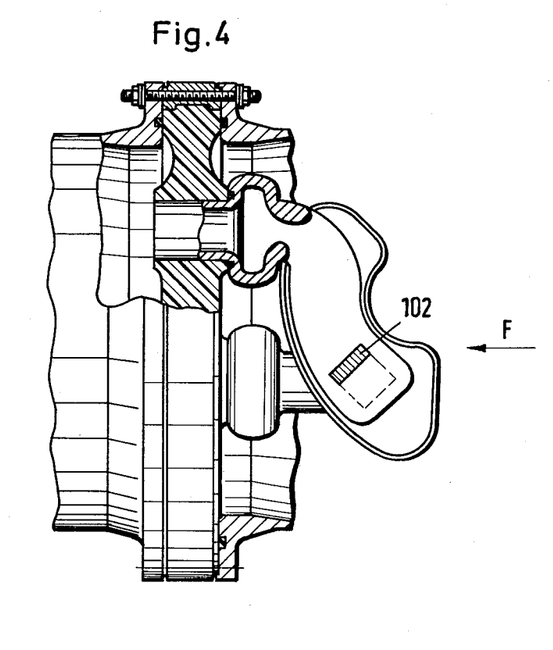
FIG. 4 is a fragmentary diagrammatic cross-sectional side view of one of the fixed contacts.

5) are aligned with their phase conductors and therefore end in their plane. The fixed contact 48 of the upper phase conductor projects downwardly into the plane of the lower first fixed contact, so that all are lying in one plane. The first fixed contacts 48 and 49 are slotted, as can also be seen from FIG. 5. The extension of the upper fixed contact 48 as well as also the other fixed contacts 90, 92 are surrounded by shielding plates 64, which will be discussed hereinbelow. The enlargements or expansions 56 likewise serve for shielding and are normally always provided beside the bulk-head insulators in order to obtain a faborable field distribution there. The movable contacts of the rotary disconnect switch 10 are each formed by a disconnect blade 66. Each blade 66 has two arms 68 and 70 which are disposed at an obtuse angle relative to each other and are practically connected to each other by means of a circular segment-like intermediate part 72. In the "on" position, the longer arm 68 of the two arms is connected to the other, second fixed contacts 50 (see the description hereinbelow); the other arm 70 is made shorter and engages into the slots of the first fixed contacts. Each disconnect blade 66 has a first half-shell 76 which is connected to a second half-shell 78; the inner contours of the two half-shells 76 and 78 together forming a hexagon so that a drive shaft 80 is gripped with a close fit. The disconnect blade 66 is held at the drive shaft 80 by means of a screw connection 82 and 84, respectively, (shown by dot-dash lines), in the form of a connecting-rod bearing. It is seen that the central axis 86 of the drive shaft 80 is outside the central axis or course 88 of the tubular gas line. Since the rotary disconnect switch is encapsulated in three phases, three disconnect blades 66 are fastened side by side on the drive shaft 80. Because of the spatial extent and in order to maintain the distances, the corresponding, likewise slotted fixed contacts 90 and 92 of the two phase conductors lying in one plane, must likewise be staggered relative to the axis of the corresponding phase conductors. In FIG. 5, the central axis 94 of the one phase conductor and the central axis 96 of the other phase conductor are seen; the central axis of the fixed contacts and the central axes of the slots 98 and 100, respectively, are offset outwardly by the amount D. The phase conductors pass through the bulk-head insulator, in a manner similar to that of the upper phase conductors, through an intermediate piece similar to the intermediate piece 55 and are continued inward, i.e. into the interior 42 of the metal encapsulation 24, in the extension to which the two fixed contacts 90 and 92 are connected; in FIG. 1, only the fixed contact 92 is visible. The free end of the fixed contacts has a slot like the central fixed contact 48, so that the corresponding disconnect blades 66 can be inserted in between. As may further be seen from FIG. 5, all fixed contacts are surrounded by the shielding 64. At the opposing inner surfaces of each slot (in FIGS. 4 and 5 this is visible only in the case of the slot 74 of the fixed contact 48), there are contact fingers 102, which are exactly opposite each other and are pushed together individually and resiliently. In the "on" condition, the lever or arm 70 engages between the opposing contact fingers 102 and in the case of a disconnect action, the intermediate part 72 slides at least onto a part of the contact fingers 102. The result is thereby achieved that during switching-off and in the switched-off condition, the entire disconnect blade is still at a voltage and therefore a defined potential is assigned to the disconnect blade. It is seen in FIG. 1 that the lower arm 68 of the disconnect blades is connected in the "on" condition to the fixed contacts 50 (only one of the blades, namely 66, being shown). In the following discussion, only the upper fixed contact will be described.

Figure 6:
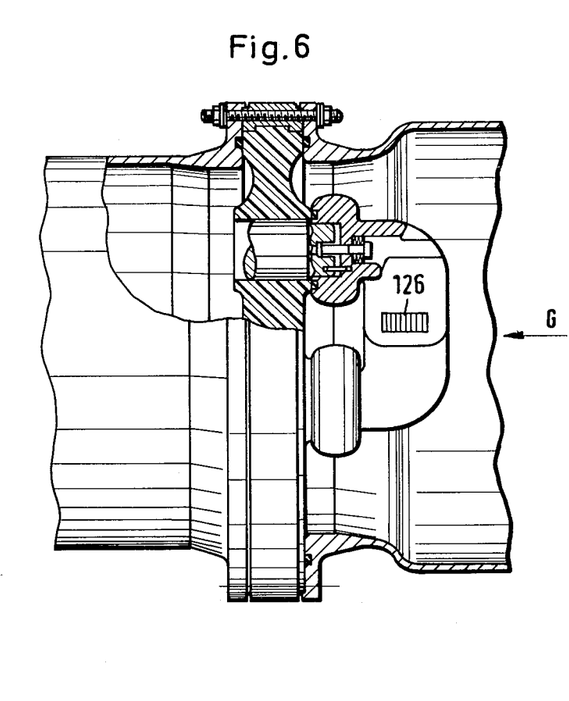
FIG. 6 is a side view similar to FIG. 4, showing the other fixed contact.
Figure 7:
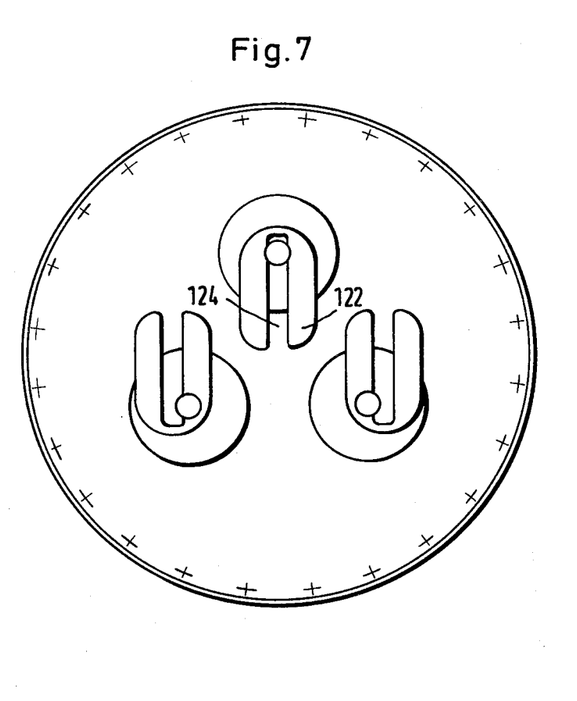
FIG. 7 is a top plan view of FIG. 6, taken in the direction of the arrow G therein onto the fixed contact.

The fixed contact 50 is connected through the intermediate piece 57 to the upper non-illustrated phase conductor which extends to the right; the fixed contact 50 also has an enlargement or expansion 104, which, contrary to the enlargement or expansion 56, has a depression or opening 106, into which an extension 108 at the intermediate piece 57 engages. The extension 108 has a smaller outside diameter than the intermediate piece 57. The extension 108 is firmly connected or bolted to the fixed contact 50 by means of a screw connection 110 with the interposition of a stack of cup springs 112; a pin 114 is provided as an antirotation device for both; it engages in a blind hole 116 in the fixed contact 50 as well as also in a blind hole 118 in the extension. The fixed contact 50 has an opening 120 so that the screw 110 can be screwed in. The contact proper of the fixed contact 50 with the arm 68 of the disconnect blade 66 is accomplished by an extension 122, which has a slot 124, as can be seen from FIG. 7. This extension 122, together with the expansion, forms an L, so that the current flow is deflected from the extension arm 70 through the expansion 104, 90° downwardly toward the arm 68. The two fixed contacts located at the bottom are constructed in the same manner as the fixed contact 50 so that they have the same reference numerals. Only the extensions 122 point upward. At the inside surfaces of the slot 124, there are again seen contact fingers 126 (see FIG. 6, which is shown in mirror symmetry to FIG. 1). These contact fingers 126 are at the same height for all fixed contacts, since the arms of all three contact blades likewise are at the same height.

In FIG. 1 is further shown a grounding contact 127, which has the shape of a lug and again has contact fingers 128. The grounding contact 127, of course, is in electrically conducting connection with the outer encapsulation 24.

The gas-tightness in the vicinity of the cutouts 52 and 54 is achieved by seals 58 and 60 disposed at the enlargement, so that no gas can penetrate inward, i.e. into the interior of the disconnect switch or diffuse out, even through possible slots in the area of the intermediate piece 57 and cutout 54 or 55 and 52. The seal or gasket at the right-hand bulk-head insulator between the flanges 14, 28, has been given the reference numeral 59.

Figure 2:
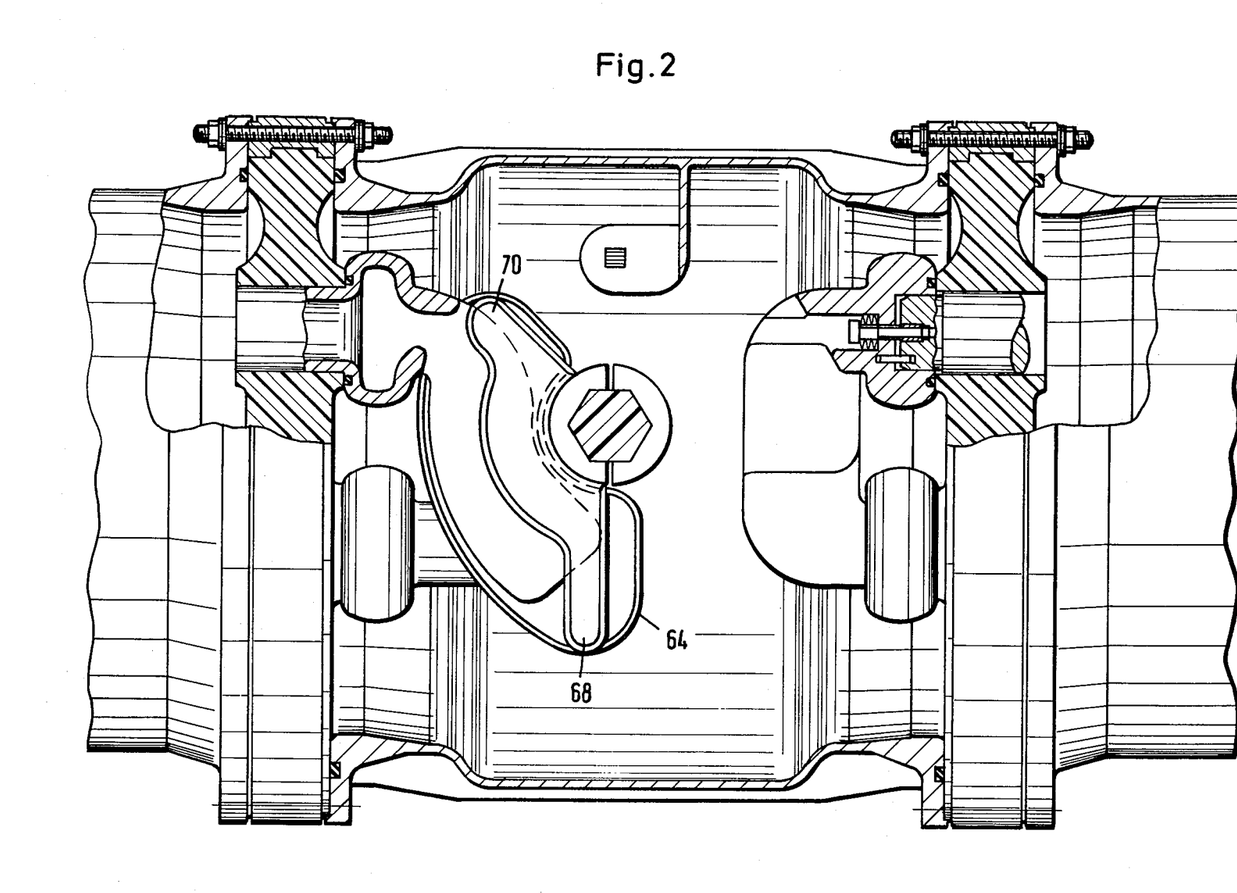
FIG. 2 is a similar view of the rotary disconnect switch according to FIG. 1 in the separated or disconnected position.
Figure 3:
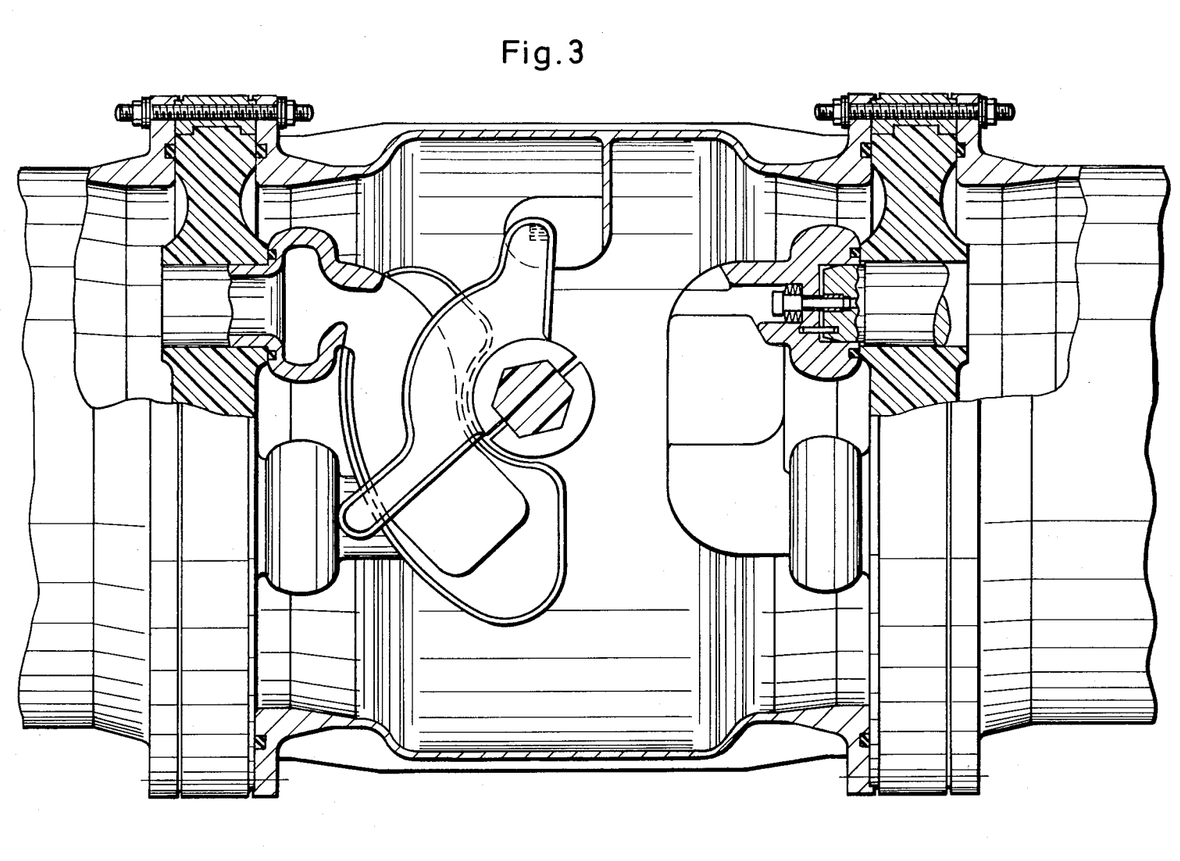
FIG. 3 is a view of the switch similar to FIGS. 1 and 2 in the grounding position.
Figure 8:
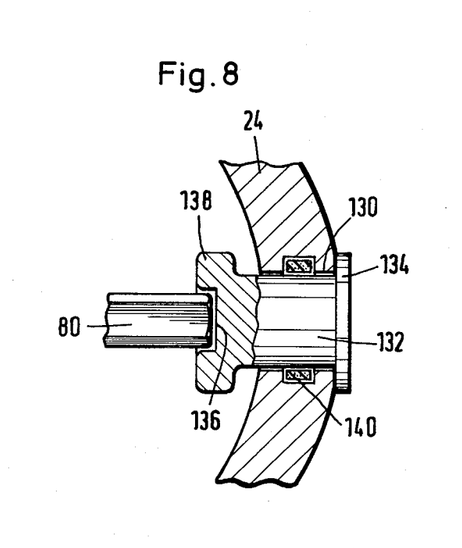
FIGS. 8 and 9 are fragmentary, diagrammatic cross-sectional views of a support point of the drive shaft in the wall of the metal encapsulation.
Figure 9:
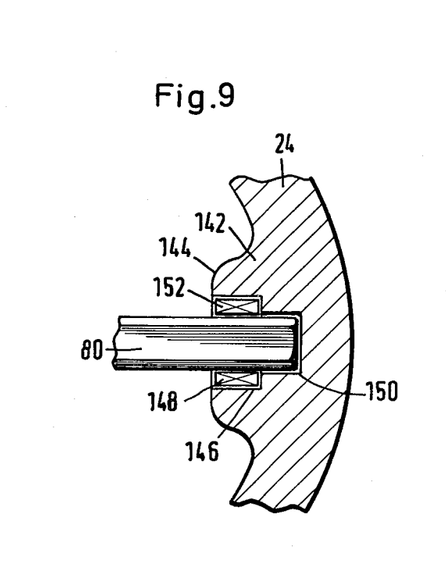

FIG. 1 shows the disconnect switch 10 in the "on" position; the two arms 68 and 70 are in electrically conducting connection with the contact fingers 126 and 102. For a disconnect action, the drive shaft 80 is turned clockwise (in the direction of the arrow U), whereby the intermediate segment or the intermediate part 72 slides onto the contact finger 102, while the arm 68 becomes free of the contact fingers 126. In the disconnected position, which is shown in FIG. 2, the two arms are practically completely within the shielding 64; this shielding 64 is constructed so that it completely surrounds the two arms 70 and 68 and the disconnect blade 66, respectively, in the disconnect position. Because the contact fingers 102 are still in connection with the intermediate part 72, each of the contact blades or disconnect blades is still at a high voltage. The possibility exists of turning the contact blades further clockwise (along the direction of the arrow U); the arm 70 is therefore moved into the region of the contact fingers 128 of the grounding contact (see FIG. 3) whereby the disconnect blade or blades are grounded. The drive shaft 80 is, of course, made of insulating material; this insulating rod must be supported at one end in the incapsulation by a bearing. The construction thereof is seen in FIGS. 8 and 9. In FIG. 8 it is seen that the metal encapsulation 24 of the disconnect switch 10 has a cutout 130 formed therein, through which a metal bearing part 132 passes. At the outer end, i.e. outside the encapsulation, the bearing part has a head 134; in the inner portion it has a cutout 136, in which the insulating rod 80 can engage. The portion 138 is rounded in order to obtain a satisfactory shielding contour. For obtaining gas tightness, seals 140 are provided. In FIG. 9, further construction of a support is shown. There, the encapsulation 24 has a second enlargement 142, which extends inwardly and the outer contour 144 of which is rounded in order to bring about a shielding effect. In the enlargement 142, a recess 146 is provided, which has a region 148 with a larger diameter and a region 150 with a smaller diameter. The region 148 with the larger diameter accepts a bearing 152 which fits the outer contour of the drive shaft 80 with its inner region (the drive shaft 80, it will be recalled, is hexagonal). The bearing 152 is circular at the outer surface thereof so that it can rotate in the region 148. The insulating rod 80 passes through the bearing 152 and further engages for guidance in the recess 150 with the smaller diameter, which is circular, so that the insulating rod 80 can rotate freely and be driven from the other end thereof. The advantage of the embodiment of FIG. 9 is that special seals as are used in FIG. 8 are not necessary.

While the shaft 80 is therefore guided at its one end against shifting in one direction in the housing, it is secured against shifting in the other direction at the other end, or by the disconnect blades, so that it cannot be shifted along its axis.

The contact fingers can also be formed directly at the contact, as spring fingers, for instance; this is achieved by the provision that the ends of the extensions are slotted. Biasing is required only to a small extent; it merely serves to compensate for small offsets and small tolerances. The contact fingers at the individual extensions themselves must be disposed so that the respective arm comes into engagement with each individual contact finger element successively. This can be achieved simply by the provision that the contact fingers are somewhat offset or extend at an angle to the front edge of the contact blade.

The half-shells 76 and 78 are made completely of metal, so that an advantageous shielding effect is also achieved here. The screws 82 and 84 and the nuts, respectively, must, of course, lie within the circumference of the half-shells, so that discharges at the exposed screw heads cannot occur.

There are claimed:

1. Rotary disconnect switch assembly, comprising a metal encapsulation insulated with $SF_6$ gas, flanges integral with said encapsulation, support insulators disposed on said flanges, a drive shaft passing through said encapsulation and having a portion disposed outside and a portion disposed inside said encapsulation, a drive connected to said outside portion of said drive shaft for rotating said drive shaft, a profile formed on said inside portion of said drive shaft, three disconnect blades fastened side by side in axial direction on said inside portion of said drive shaft, intermediate pieces passing through said support insulators from within said encapsulation and being connectible to phase conductors leading outwardly from said support insulators, and an opposite pair of first and second fixed contacts for each individual phase connected along said intermediate pieces in said encapsulation in axial direction of said drive shaft, said blades being rotatable with said drive shaft between an on position in which they connect said first and second contacts to each other and a disconnect position.

2. Rotary disconnect switch assembly according to claim 1, wherein the switch has a space formed in the interior thereof, and said support insulators are in the form of bulk-head insulators terminating in said space.

3. Rotary disconnect switch assembly according to claim 1, including three phase conductors disposed at corners of an imaginary triangle, two of the conductors being disposed in one plane and the third being disposed intermediate and vertically thereabove, two of said fixed contacts being aligned with the two conductors, and a slightly bent L-shaped connecting piece connecting the remaining fixed contact to the intermediate upper conductor.

4. Rotary disconnect switch assembly according to claim 1, including two arms integral with each of said blades, said arms being disposed in the same plane and being eccentric with respect to said drive shaft.

5. Rotary disconnect switch assembly according to claim 1, wherein each of said blades is in the form of an angle lever having a pair of long and short arms respectively connectible to said first and second contacts, said arms being mutually offset by approximately 135°.

6. Rotary disconnect switch assembly according to claim 5, including a circular segment-shaped intermediate part connected to each of said pair of arms.

7. Rotary disconnect switch assembly according to claim 5, including mutually aligned L-shaped ends integral with each of said fixed contacts connectible to said long arm of said blades.

8. Rotary disconnect switch assembly according to claim 1, wherein said fixed contacts are integral with said intermediate pieces.

9. Rotary disconnect switch assembly according to claim 1, wherein the axis of said drive shaft is outside the axis of said encapsulation 10. Rotary disconnect switch assembly according to claim 1, wherein said drive shaft has a non-circular cross-sectional shape.

11. Rotary disconnect switch assembly according to claim 1 or 10, including a first half-shell integral with each of said blades and a mounting bracket connectible to said first half-shell, said first half-shell and said mounting bracket having contours formed therein together matching the cross-sectional shape of said drive shaft.

12. Rotary disconnect switch assembly according to claim 11, including a screw and nut for connecting said first half-shell to said mounting bracket after mounting on said drive shaft.

13. Rotary disconnect switch assembly according to claim 1, wherein said fixed contacts have slots formed therein forming inner surfaces spaced apart by a distance corresponding to the thickness of said blades, said blades being insertable into said slots, and including opposing contact fingers disposed on said inner surfaces of said contacts, said fingers being resiliently contactible with said blades.

14. Rotary disconnect switch assembly according to claim 13, wherein said contact fingers are laminations formed on said contacts.

15. Rotary disconnect switch assembly according to claim 5, wherein said blades are further rotatable beyond said disconnect position into a grounding position, and including a grounding contact contactible by said short arm in said grounding position.

16. Rotary disconnect switch assembly according to claim 15, wherein said grounding contact is fastened to and extended outside said encapsulation, and including a frame for insulating said grounding contact from said encapsulation, and means for connecting said grounding contact to said encapsulation.

17. Rotary disconnect switch assembly according to claim 1, including shieldings being matched to the outer contour of a disconnect blade and surrounding said contacts, said blades being disposed substantially within said shielding in said disconnect position.

* * * * *